P. T. ARDUINO.
APPARATUS FOR HEATING LIQUIDS.
APPLICATION FILED DEC. 3, 1907.

946,311.

Patented Jan. 11, 1910.

UNITED STATES PATENT OFFICE.

PIETRO TERESIO ARDUINO, OF TURIN, ITALY.

APPARATUS FOR HEATING LIQUIDS.

946,311.  Specification of Letters Patent.  Patented Jan. 11, 1910.

Application filed December 3, 1907. Serial No. 404,973.

*To all whom it may concern:*

Be it known that I, PIETRO TERESIO ARDUINO, a subject of the King of Italy, and residing at Turin, Italy, have invented certain new and useful Apparatus for Heating Liquids, of which the following is a specification.

This invention relates to an apparatus for instantaneously heating small quantities of liquids of the kind sold in cafés, for instance, coffee, milk, soup, punch, etc. In the apparatus according to this invention the said liquid may be stored cold in a tank, so that its taste may not be impaired and so that it may be drawn off at a very high temperature according to requirements, as the heating takes place during the time that the predetermined quantity of liquid is passing through the space between the measuring tank and the tap, the passage being effected without stopping.

Figure 1:
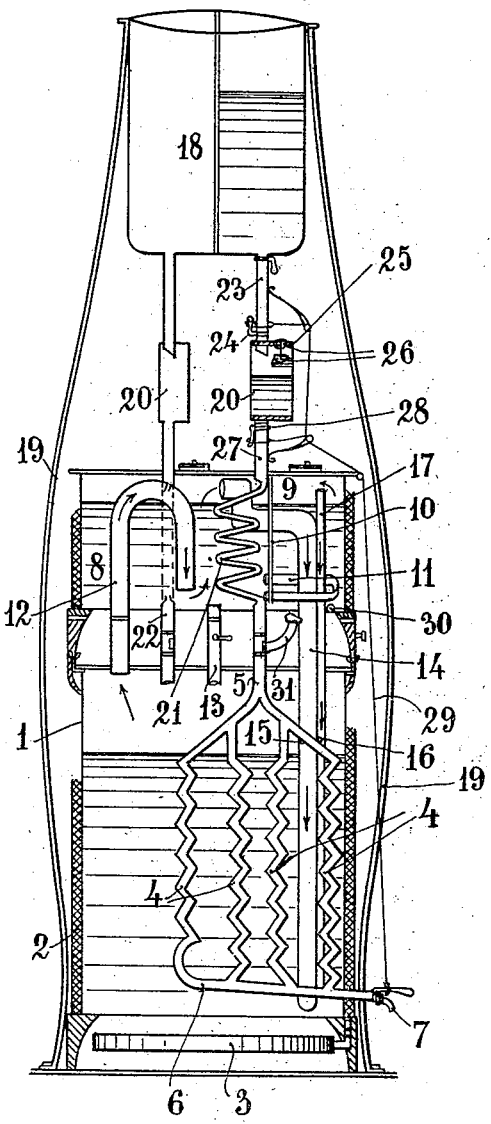
Figure 4:
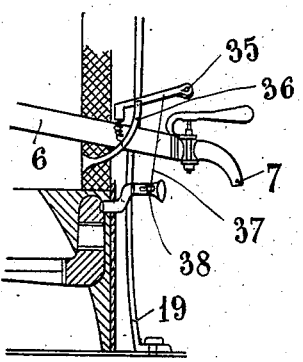
Figure 3:
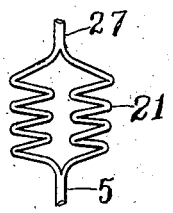
Figure 2:
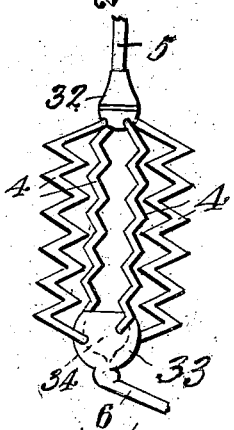

In the accompanying drawing: Figure 1 is a view of the interior of a constructional form of the apparatus according to this invention the tanks being shown in section. Fig. 2 shows a modified form of heating pipe. Fig. 3 shows the double coil by means of which the liquid is subjected to preliminary heating, and Fig. 4 shows an arrangement which is applied to apparatus according to this invention when such apparatus is intended for heating punch or similar alcoholic drinks for the purpose of igniting the jet of liquid at that moment at which it leaves the heating apparatus.

The apparatus comprises a lower tank 1 covered with a layer of non-conducting material 2 and heated by the furnace 3. In the interior of the tank 1 are arranged one or more sets (according as the apparatus is intended to heat one or more liquids at the time) of zig-zag pipes 4 mounted between the same planes and connected at the top to a pipe 5. The said pipes open at the bottom into an inclined pipe 6 leading to the discharge tap 7. Above the tank 1 there is mounted another tank also supplied with non-conducting covering and divided into compartments 8 and 9 separated by a wall 10. Secured within openings in the wall 10 is a U-shaped pipe 11 which lies in the tank 9 and has its open ends communicating with the tank 8. The compartment 8 communicates with the tank 1 by means of a U-shaped pipe 12 and a pipe 13 having a cock therein. The compartment 8 is also provided with a discharge pipe 14 for steam, the said pipe passing through the tank 1 and being provided with holes 15 and 16 which open into the upper part of the said tank 1. The compartment 9 is also provided with a discharge pipe 17 for steam that might be generated therein.

At the top of the apparatus is arranged a tank 18 which can be divided into several compartments and may be made of any suitable material which will keep the liquids cool. Uprights 19 secured to the bottom of the apparatus support the said tank. Communication between the tank 18 and the heating pipes 4 is effected through a measuring tank 20 and a double coil 21 as shown in Figs. 1 and 3, placed in the compartment 8 of the intermediate tank. If it is desired to heat alcoholic liquors which evaporate very easily, a pipe of the form shown at 22 (Fig. 1) is provided. That is to say, the zig-zag pipe 21 may be replaced by a straight tube as 22 but in any case a lower zig-zag pipe 4 is employed. The measuring tank 20 consists of a glass cylinder of the desired capacity with a socket at each end, through the upper one of which passes the pipe 23 leading to the tank 18 and controlled by a valve 24 which is normally open. The said socket or cover also comprises a hole 25 which is adapted to be closed by a float valve 26. The bottom or lower socket of the measuring tank has passing through it the pipe 27 leading to the coil 21 and controlled by a valve 28 normally closed. The two valves 24 and 28 are operated simultaneously with the tap 7 by means of a cord 29 guided by rollers.

The operation of the apparatus will be readily understood from the preceding description. Water is introduced into the compartments 8 and 9 and into the bottom tank 1 in which it is heated by the furnace 3 to a temperature below 100° C. Any steam generated in the tank 1 passes through the pipe 12 into the compartment 8 and helps to heat the water contained therein, while any steam that might be generated in the compartment 8 is discharged through the pipe 14 and transmits heat to the water contained by the compartment 9 and the tank 1. The water within the compartment 9 is also heated by the U-shaped pipe 11 in which hot water from the compartment 8 circulates. In that way a certain quantity of pure water is always kept hot in the compartment 9 and can be withdrawn through the hole 30 for admixture with other liquids.

When it is necessary to supply water to the tank 1, it is sufficient to operate the valve in the pipe 13 in such a manner that previously heated water is introduced from the compartment 8. The heating of the liquid contained in the measuring tank 20 at the temperature of the surrounding atmosphere takes place in the following manner: At the same time as the tap 7 is opened, the valve 24 is closed, so that all communication between the measuring tank 20 and the tank 18 is interrupted, and the valve 28 remains open, so that liquid from the tank 20 passes through the pipe 27 into the double coil 21 and is subjected there to a preliminary heating, whereupon it passes through the pipe 5 into the zig-zag pipes 4, where it is sub-divided and passing through all the bends, acquires the temperature of the water contained in the tank 1, finally escaping from the tap 7 at a high temperature. The quick descent of the liquid is assisted by the air-hole 31, which allows air to enter the zigzag tubes as the liquid flows therethrough, thus neutralizing the depression which would otherwise be caused in said tubes, and also by the fact that when the level in the measuring tank 20 is lowered, the float valve 26 opens and admits air through the hole 25. It will be understood that if this conduit were without an opening for the admission of air, the liquid would descend very slowly on account of the partial vacuum or depression which would form in the part of the conduit it has already traversed. When the tap 7 is released, the springs return the valves 24 and 28 into their normal position, closing the latter and opening the former, so that a fresh quantity of liquid descends from the tank 18 into the measuring tank 20 until the liquid having reached a certain level, the float valve 26 is closed.

In the apparatus according to this invention, the liquid drawn through the tap 7 is quickly heated during its passage from the cold tank to the tap 7, owing to the arrangement of the series of pipes 4 in which the mass of liquid is divided and which, being of zigzag shape, do not allow the liquid to remain in continual contact with their walls as is the case with ordinary coils, so that transmission of heat from the metal walls of the pipes 4 to the liquid takes place only at the points where there is contact, while the bends keep the maximum temperature of the tank 1 and, as soon as the liquid has passed, the loss of temperature occasioned thereby is promptly reëstablished by the conductivity of the metal walls.

The pipes 4, instead of being located between the same planes, could also be arranged radially; in that case (Fig. 2) communication with the pipe 5 is effected by means of an enlarged portion 32 while the pipes 4 open into an almost spherical chamber 33 in which is arranged a container 34 filled with hot water from the tank 1. The liquid descending from the widened portion 32, passes through the pipes 4, the elements of which form with each other more acute angles than those shown in Fig. 1, retard the travel of the liquid but increase the temperature of the same, and finally descends into the interval between the walls of the chamber 33 and of the container 34, both of which are hot and is still more subdivided owing to the shock, so that a very high temperature is acquired at the time that the liquid is discharged through the pipe 6.

Fig. 4 shows on an enlarged scale the device by means of which punch and similar alcoholic liquids may be ignited on escaping from the tap 7. To that end there is mounted a lever 35 pivoted in a bracket 36 secured to the wall of the tank. The lever 35 controls by means of a rod 37 the burner 38 of a permanent flame fed with gas from the furnace, so that, by lowering the lever 35 at the same time as the tap 7 is opened, a flame is produced which ignites the jet of hot liquid escaping from the tap 7.

The apparatus according to this invention has the advantage of heating a predetermined quantity of liquid in a very short time (three seconds with pipes of the form shown in Fig. 1, four seconds with pipes of the form shown in Fig. 2) during the passage of the liquid from the tank 18 to the discharge tap 7, so that the manipulation of the apparatus is simple and does not require any special attention, while the heat is utilized completely owing to the arrangement of the different parts, and a remarkable saving of gas is effected, as the furnace 3 need be lighted only from time to time when the temperature of the water in the tank 1 is reduced, which takes place very slowly and only after a considerable number of operations. Moreover, by heating the liquids just at such time as they are required, their taste is not impaired, the strictest rules of hygiene are complied with as the said liquids are not in contact with the atmosphere until they issue from the tap and a great saving of liquid is effected as the measuring tank 20 discharges exactly the quantity required at each operation.

What I claim as my invention, and desire to secure by Letters Patent is:—

1. In an apparatus for heating liquids a plurality of superposed tanks adapted to contain liquids, means connecting the intermediate and lower tanks, a coiled outlet pipe for said upper tank passing through said intermediate tank, a series of zigzag pipes connected with said outlet pipe and within said lower tank and means for allowing only a desired quantity of liquid to be dispensed and heated in passing from the upper tank through the zigzag pipes.

2. In an apparatus for heating liquids, a lower tank, an upper tank and an intermediate tank, each tank adapted to contain liquid, means connecting the intermediate and lower tanks, a coiled outlet pipe for said upper tank passing through said intermediate tank, a series of zigzag pipes connected with said outlet pipe and within said lower tank, and a transparent measuring vessel having a float valve and controlling valves for allowing only a desired quantity of liquid to be dispensed and heated in passing from the upper tank through the zigzag pipes.

3. In an apparatus for heating liquids, a tank adapted to contain liquid, means for heating said liquid, a series of radially disposed acute angled zigzag pipes within said tank, a spherical chamber connecting said pipes, a receptacle for hot liquid within said chamber, an upper tank adapted to contain liquid, a pipe connecting said upper tank with said zigzag pipes and means for allowing only a desired quantity of liquid to be dispensed and heated in passing from the upper tank through the zigzag pipes.

4. In an apparatus for heating liquids, a tank adapted to contain liquid, means for heating said liquid, a series of zigzag pipes connected by a discharge pipe and within said tank, an upper tank adapted to contain an alcoholic liquid, a pipe connecting said upper tank with said zigzag pipes, a valve terminating the discharge pipe therefrom, a gas burner arranged in proximity to said valve for igniting the outflowing alcoholic liquid and means for allowing only a desired quantity of said liquid to be dispensed and heated in passing from the upper tank to the discharge valve.

In testimony whereof I have signed my name to this specification in the presence of two subscribing witnesses.

PIETRO TERESIO ARDUINO.

Witnesses:
 CARLO SORTA,
 LOUIS ALLAN.